United States Patent [19]
Kouzu et al.

[11] Patent Number: 5,826,980
[45] Date of Patent: Oct. 27, 1998

[54] NON-CONTACT THERMOMETER

[75] Inventors: Katsumi Kouzu, Hyogo; Shigehiro Yoshiuchi, Osaka; Koji Oike, Hyogo; Masaaki Matsui; Kazuto Kume, both of Osaka, all of Japan

[73] Assignee: Matsushita Electric Industrial Co., Ltd., Osaka, Japan

[21] Appl. No.: 704,184

[22] Filed: Aug. 28, 1996

[30]     Foreign Application Priority Data

Aug. 29, 1995 [JP] Japan .................................. 7-220047

[51] Int. Cl.⁶ ................................ G01J 5/08; G01J 5/04; G01K 3/06
[52] U.S. Cl. ..................... 374/124; 374/130; 250/338.3
[58] Field of Search ................... 374/130, 124; 250/338.3, 339.04

[56]         References Cited

U.S. PATENT DOCUMENTS

| 4,634,294 | 1/1987 | Christol et al. ............................ 374/130 |
| 4,986,672 | 1/1991 | Beynon ..................................... 374/130 |
| 4,998,826 | 3/1991 | Wood et al. ............................... 374/130 |
| 5,528,038 | 6/1996 | Yoshiike et al. ........................ 250/338.3 |
| 5,567,052 | 10/1996 | Yoshiike et al. ......................... 374/130 |
| 5,660,471 | 8/1997 | Yoshiike et al. ......................... 374/130 |

FOREIGN PATENT DOCUMENTS

| 0044791 | 1/1982 | European Pat. Off. ............... 374/130 |
| 1325438 | 8/1973 | United Kingdom ................... 374/130 |

*Primary Examiner*—Diego F. F. Gutierrez
*Attorney, Agent, or Firm*—McDermott, Will & Emery

[57]             ABSTRACT

A non-contact thermometer uses a pyroelectric infrared sensor which makes it possible to measure temperatures of an object having a large area required to be measured, and at a plurality of points. The thermometer sets up a reference position without using a position detecting switch and also improves the accuracy of measuring the temperature due to its increased amount of incident infrared rays transmitted as a result of reducing the motor speed and extending the time of measurement at the point where infrared rays of the object to be measured is to be detected. The thermometer's stepping motor is fed with its operation step input and brought to a stop at the reference exciting phase of the motor which has been set up in advance. The whole measurement operation thereafter is arranged to proceed, starting from the above exciting phase serving as the reference, at which point the motor was brought to a stop.

6 Claims, 12 Drawing Sheets

NON-CONTACT THERMOMETER

BACKGROUND OF THE INVENTION

The present invention relates to a non-contact thermometer for detecting the existence of an object to be examined and/or measuring surface temperatures of the object by means of a pyroelectric infrared sensor that remotely detects infrared rays radiated from the object in a non-contact manner.

A pyroelectric element disposed in a pyroelectric infrared sensor is spontaneously polarized and electrical charges are developed on its surface at all times. These electrical charges are coupled with electrical charges in the air under normal steady state condition, thereby presenting an electrically neutral charge. When infrared rays are incident on the pyroelectric element under this steady state condition, the temperature of the pyroelectric element is changed and the electrically neutral condition is then disturbed, resulting in changes in surface electrical charges. At which time it becomes possible to measure the amount of incident infrared rays by detecting the electrical charges developed on the surface of the pyroelectric element. When this pyroelectric element is used in a thermometer, the amount of infrared rays radiated from the object being examined is then compared with that from the another object, of which the temperature is already known. The temperature of the object to be examined can be determined by the difference in the amount of infrared rays between these two objects. Methods of measuring temperatures of inner walls of a cylindrically-shaped chopping drum having a bottom, can be used to determine the relation between the amount of infrared rays and the temperature levels. These methods (e.g., by means of a thermistor or the like) make it possible to measure the temperature of the object to be measured.

FIG. 11 is an exploded perspective view showing the structures of a conventional non-contact thermometer using a pyroelectric infrared sensor, as described above.

As illustrated in FIG. 11, the prior art non-contact thermometer comprises: a stepping motor 21 (referred to as a motor hereafter) mounted on a unit base 22, which is capable of rotating in clockwise and counterclockwise directions and also capable of controlling a specified incremental rotational angle in steps; a bottomed cylindrical type chopping drum 24, including an arc-shaped cam 24b, which is rotated by the motor 21 and provided with slits 24a, each of which has an opening at one end; a pyroelectric infrared sensor 26 disposed in the chopping drum 24 for detecting infrared rays radiated from an object to be measured, which passes through the slits 24a of the chopping drum 24, a temperature detection means 30 for detecting the temperature of the above chopping drum 24; a swing arm 23 having a cam follower 23e that sustains contact with a cam 24b provided on the cylindrical chopping drum 24; a holder 25 that is attached to the swing arm 23 and maintains the position of the pyroelectric infrared sensor 26 inside the cylinder of the chopping drum 24; a switch 31 for setting a reference position of activation; a protecting shutter 29 that shields the pyroelectric infrared sensor 26 from the surrounding environment when it is not in use; and a shielding case 28 for covering all the elements as described above.

The pyroelectric infrared sensor 26 includes a lead terminal 26a that has a 90° bend. Other electronic components are mounted on a printed circuit board 27a, which are fixed on the sensor holder 25 by screws and are electrically connected to other external circuits through lead wires and connectors.

FIG. 12 shows one of the simplest structures of a pyroelectric type temperature measurement instrument. The problem associated with this structure is that a cylindrical chopper 32a is rotated within an exterior case 30 having a window such that the detection of temperatures of an object can be measured at only a single point.

In order to solve this problem, a method of rotating a sensor and an exterior case by 360° was conceived. However, this presents another problem in that a large driving motor for the sensor 31 is required and this method is not suitable for measuring a specific temperature range of an object to be measured.

When it is desired to detect a specific temperature range of an object to be measured, a conventional method is provided wherein a motor 32b in the foregoing non-contact thermometer is rotated clockwise and counterclockwise, and a swing arm mounted with the sensor 31, is made to swing by a cam provided on the cylindrical chopper 32a.

The foregoing swinging action makes it possible to measure the amount of infrared rays within the swinging angle range. Thus, enabling the detection of temperatures for each respective measurement spot in a non-contact manner. However, this non-contact thermometer is constructed so that the exciting phase of the foregoing motor 32b may serve as a reference position when the motor 32b is brought to a stop upon activating a position detection switch after continuous rotation. The motor 32b continues rotating when the non-contact thermometer is not in use and stops only when the position detection switch is turned on.

Therefore, the measurement of the amount of infrared rays radiated from an object to be measured is likely to be incorrect due to a reduced accuracy of the motor's continual revolving motion. This is caused by variations in the components employed, rotational performance and the like, as well as leakage of light and the like.

SUMMARY OF THE INVENTION

The conventional non-contact thermometer, as described above, suffers from various problems, such as requiring preforming processes and numerous assembly steps because of the design of the pyroelectric infrared sensor 26 in relation to the lead terminal 26a. In particular, the pyroelectric infrared sensor 26 is preformed with a 90° bend and is then inserted into the sensor holder 25. The lead terminal 26a of the pyroelectric infrared sensor 26 is inserted in the printed circuit board 27a, having various electronic components mounted thereto, which are affixed by a soldering means.

Moreover, since a very small input to the foregoing pyroelectric infrared sensor 26 is amplified by about 1000 times before being outputted, even the slightest noise will interfere with the performance of the sensor as such noises will infiltrate into the sensor through the lead terminals 26a and the like. This presents a problem since the accuracy of the sensor's detection is adversely affected.

A first object of the present invention is to solve the foregoing problems associated with the prior art by providing a non-contact thermometer which has fewer number of assembly steps, has lower manufacturing costs and stabilizes performance and detection.

In order to solve these problems, the non-contact thermometer of the present invention is structured as shown in FIG. 1 and comprises: a stepping motor 1 linked with a unit base 2; a chopping drum 4 which is cylindrically-shaped with a bottom, having a plurality of cut-outs formed around its outer walls and linked with the stepping motor 1; a pyroelectric infrared sensor 6 placed inside the chopping drum 4; a flexible printed circuit board 7a, comprising a thermistor 12 mounted thereon that detects the temperatures of the pyroelectric infrared sensor 6 and the interior of the chopping drum 4, and also comprises a comparator mounted thereon that compares the outputs of the thermistor 12 corresponding to the temperature of the pyroelectric infrared sensor 6 and the interior of the chopping drum 4, wherein the output side of which is connected to the unit base 2; a swing arm 3, having an upper part of which is coupled with the sensor holder 5 that holds the pyroelectric infrared sensor 6, and being placed between the unit base 2 and the chopping drum 4 so as to be freely rotatable; and a shield case 8 which is provided with a window and which is mounted on the unit base 2.

Further, a boss 5c is formed on the sensor holder 5 and a hole, having an inner diameter that is smaller than the outer diameter of the boss 5c, is formed on a copper foil pattern of the flexible printed circuit board 7a. Thus, the sensor holder 5 is fixed to the flexible printed circuit board 7a by pressing the boss 5c into the foregoing hole formed in the flexible printed circuit board 7a.

In addition, a feedthrough ceramic capacitor 9 is mounted on the unit base 2, which is made from solder plated steel, by inserting it into a pillar hole 2c and affixing it with solder. One end of the feedthrough ceramic capacitor 9 is connected to the output side of the flexible printed circuit board 7a with the other end thereof connected to external circuits.

According to the structure as described above, all of the electronic components are mounted on the same upper surface of a flexible printed circuit board, of which has excellent bending properties. Therefore, even if there are some components that require to be mounted on the bottom surface of the flexible printed circuit board because of the directional requirements thereof, those components can be mounted on the same upper surface after the flexible printed circuit board has been bent over. In turn, this eliminates a lead preforming process which conventionally has been required, and thereby reduces the number of assembly steps.

In addition, the flexible printed circuit board 7a can be easily and accurately fixed to a sensor holder 5 without the use of any mounting fixtures by way of having a boss 5c formed on the sensor holder whereby the boss is pressed into a pillar hole 8b provided on the shield case 8.

Furthermore, the intrusion of external noises can be prevented by connecting the circuit inside a non-contact thermometer with the external circuit via a feedthrough ceramic capacitor 9a, which is mounted by inserting the capacitor into the unit base 2 and fixing it thereto with solder.

A second object of the present invention is to provide a non-contact thermometer which is suitable for measuring the temperatures of an object that exists within a specified range of angles, and which measures these temperatures in a stable and accurate manner.

In order to achieve this object, the non-contact thermometer of the present invention comprises: a stepping motor 1 which is mounted on a unit base 2, rotatable in the clockwise and counterclockwise directions and controllable in incremental rotational angles; a cylindrical chopping drum 4 rotated by the motor 1 and provided with opening slits 4a; a pyroelectric infrared sensor 6 for detecting infrared rays radiated from an object to be measured, which passes through the slits 4a of the cylindrical chopping drum 4; a temperature detection means, such as a thermistor 12 for detecting temperatures of the cylindrical chopping drum 4; a cam provided on the cylindrical chopping drum 4; a swing arm 3 having a cam follower 3h that comes into contact with the cam; a sensor holder 5 that holds the pyroelectric infrared sensor 6 and which is located inside the cylinder of the cylindrical chopping drum 4; and a shielding case 8, which has a window 8a for receiving infrared rays from the object to be measured, and covers the cylindrical chopping drum 4, swing arm 3, pyroelectric infrared sensor 6 and sensor holder 5.

The present invention enables the motor 1 to give a stepping operation that is needed to measure the temperature. It also establishes a structure so as to set up a performance reference position by activating the number of steps needed for containing the pyroelectric infrared sensor 6 and reaching a specified exciting phase that serves as a reference.

Accordingly, the present invention makes it possible to set up the reference position without relying on a position detection switch and, thus, enhance the detection accuracy by controlling the rotation of the motor which revolves at different speeds.

In addition, the rotational performance of the chopping drum and that of the swing arm can be synchronized with each other. The chopping drum is rotated by the stepping motor 1, which is rotatable in both directions, thus changing the amount of infrared rays incident on the pyroelectric infrared sensor, and at the same time, rotating the foregoing pyroelectric infrared sensor.

Therefore, the temperature of an object to be measured can be detected and measured at a plurality of positions located within a specific area, by measuring the signal from the temperature detection means which detects the temperature of the chopping drum and the temperature differential signal. The temperature differential signal is obtained from the foregoing pyroelectric infrared sensor by determining the temperature differential which exists between the chopping drum and the object to be measured by using a temperature calculation means.

DESCRIPTION OF THE PREFERRED EMBODIMENTS

[Exemplary Embodiment 1]

Figure 1:
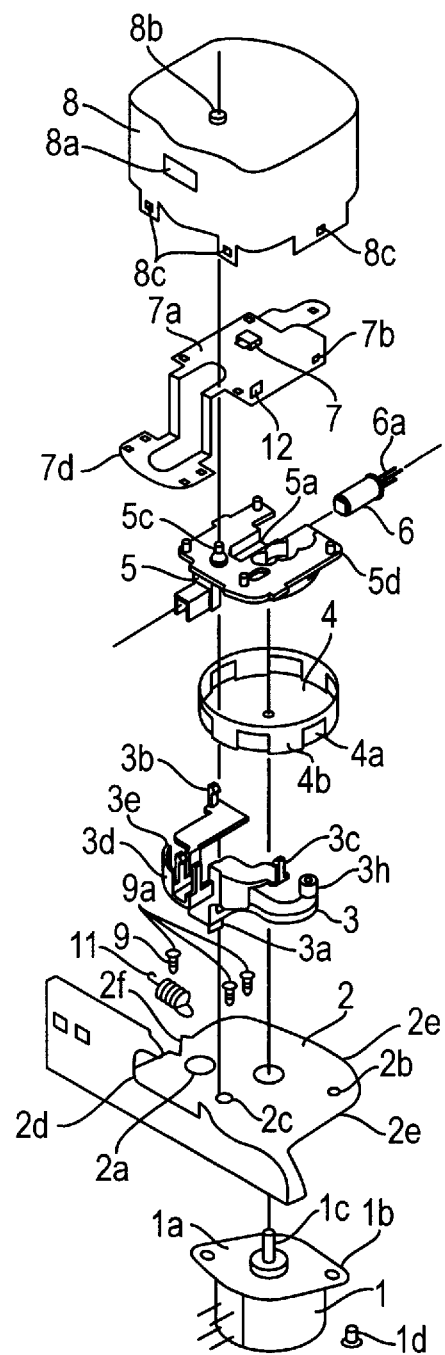
FIG. 1 is an exploded perspective view of a non-contact thermometer for the first and second exemplary embodiments of the present invention.
Figure 2A:
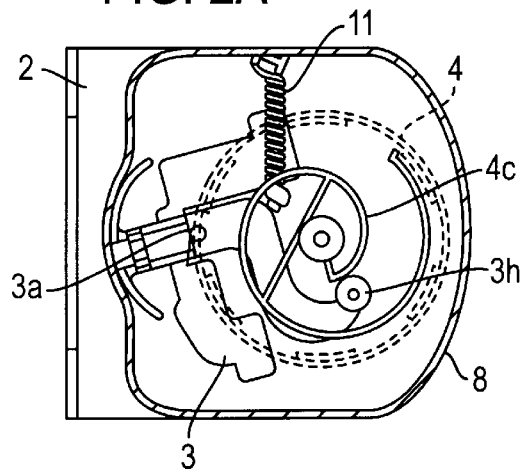
FIG. 2(a) to FIG. 2(c) are top plan sectional views to show operating conditions of a swing arm in the first exemplary embodiment of the present invention.
Figure 2B:
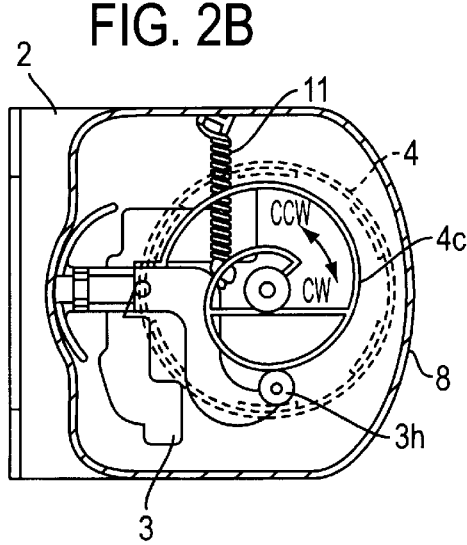
Figure 2C:
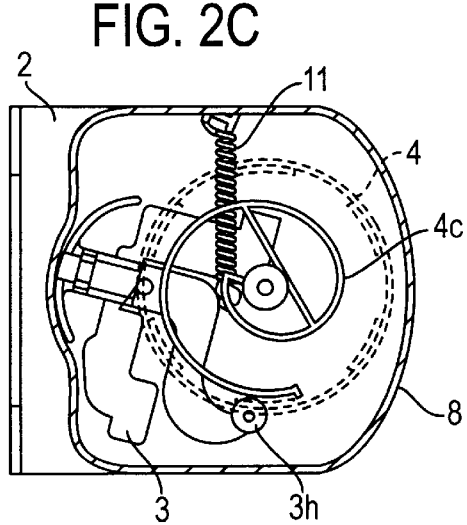
Figure 3:
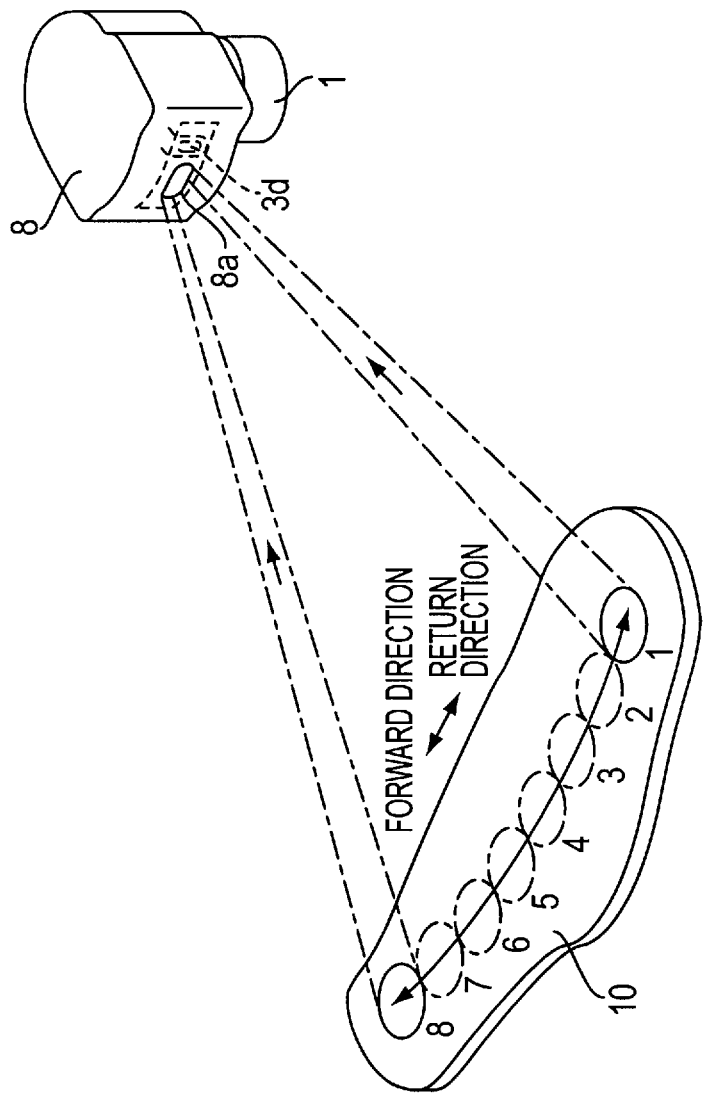
FIG. 3 is a perspective view to show how to use the non-contact thermometer in the first and second exemplary embodiments of the present invention for measuring temperature.

Turning now to FIGS. 1–3, FIG. 1 shows how the non-contact thermometer of the first exemplary embodiment of the present invention is structured. As illustrated in FIG. 1, a stepping motor 1 (referred to as "motor" hereafter), which is rotatable in both directions, is linked to a unit base 2 by inserting a motor flange 1a into a slit 2a, which is formed in the unit base 2, and fastening a screw 1d in a threaded hole 2b, which is also formed in the unit base 2, via a threaded hole 1b disposed in the motor flange 1a.

A swing arm 3 is arranged between the unit base 2 and a chopping drum 4, which is fixed to the shaft 1c of the motor 1. The swing arm 3 is supported by inserting a pillar 3a, which is formed on the swing arm 3, into a unit base pillar hole 2c so that the swing arm 3 may rotate around the pillar 3a, thereby serving as the center of rotation.

The chopping drum 4 is cylindrically-shaped with a bottom and has a plurality of slits 4a disposed in the walls 4b, and which are uniformly spaced along the walls 4b of the cylindrical chopping drum 4. In addition, the swing arm 3 is continually subjected to tension forces exhorted by a tension spring 11.

Figure 9:
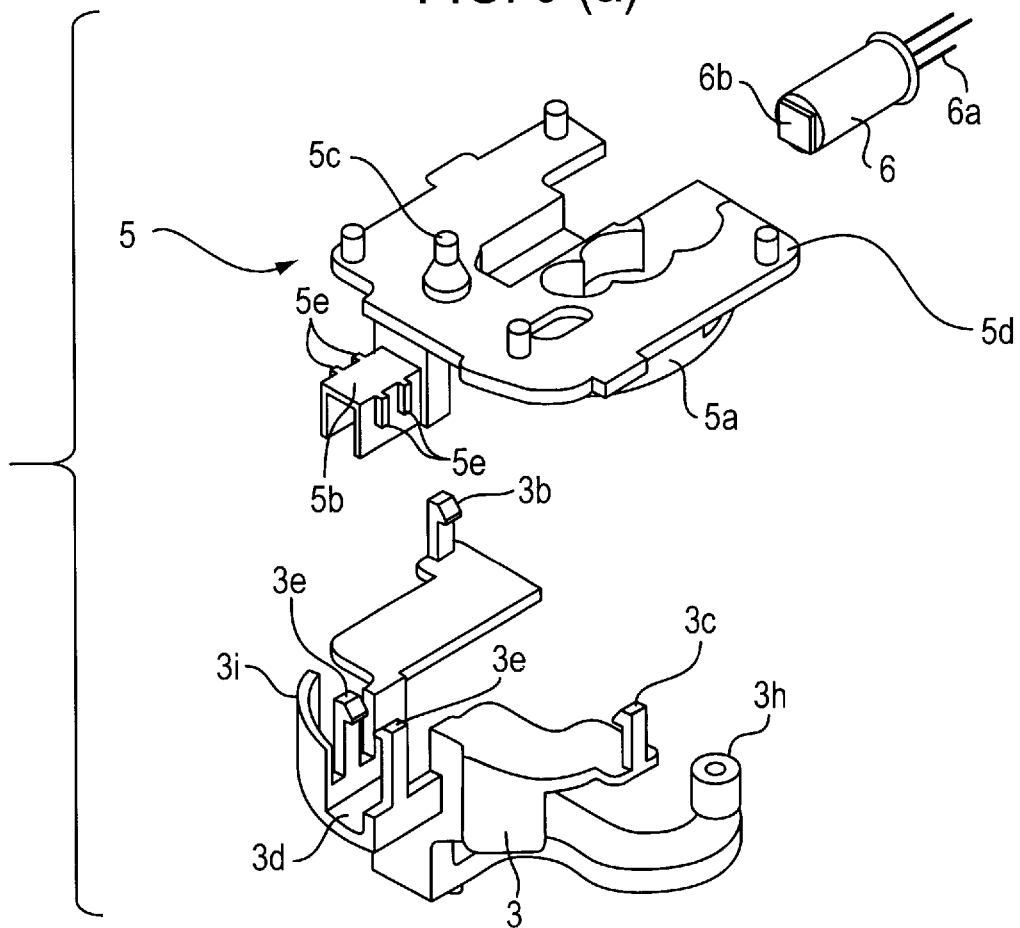
FIG. 9(a) and FIG. 9(b) are an exploded perspective view and a plan view, respectively, to show how the aperture of the non-contact thermometer is structured in the second exemplary embodiment of the present invention.
Figure 9:
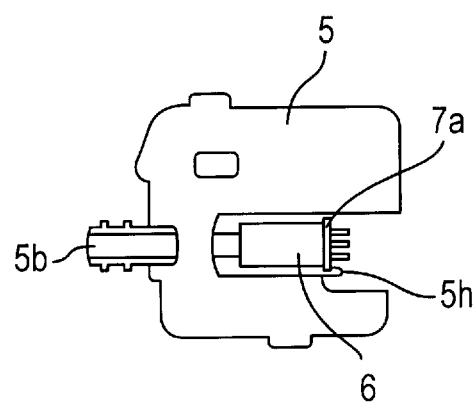

FIG. 9 shows how a sensor holder 5 is structured. As shown in FIG. 9, a sensor holding member 5a is provided on the sensor holder 5 so that it may be located inside the cylinder of the chopping drum 4 and held by a clamping means provided by claws 3b and 3c formed on plates located in the upper section of the swing arm 3, and which extends over the chopping drum 4. Also, claws 3e are formed in an aperture 3d that is situated between a shield case window 8a and a pyroelectric infrared sensor 6.

Figure 4:
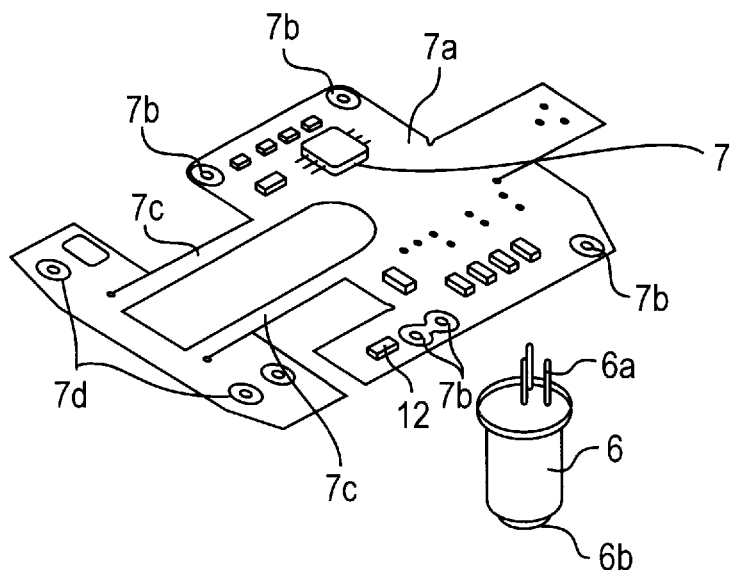
FIG. 4(a) and FIG. 4(b) are perspective views to show the structures of the flexible printed circuit board in the first exemplary embodiment of the present invention.
FIG. 4(c) is a cross-sectional view to show how the flexible printed circuit board and a sensor holder are put together for the first and second exemplary embodiments of the present invention.
Figure 4:
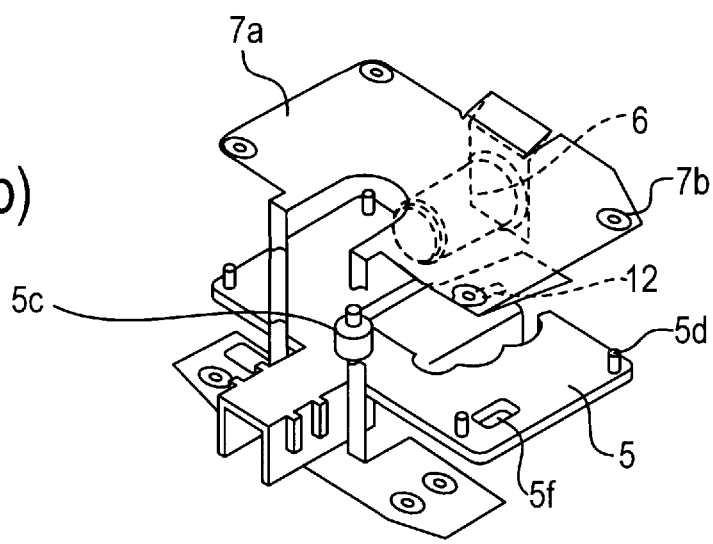
Figure 4:
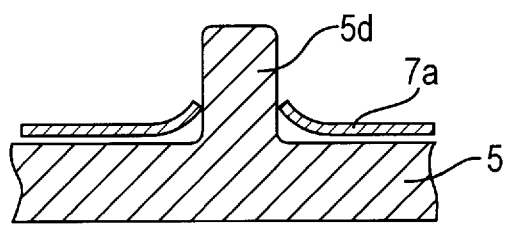

Referring to FIGS. 1 and 4, an electronic circuit 7 includes mounting pads formed on a flexible printed circuit board 7a, which is connected to lead wires 6a of the pyroelectric infrared sensor 6. Also, connector terminals 7d, which are located in the output section of the flexible printed circuit board 7a, are connected to leads 9a of a feedthrough ceramic capacitor 9 that is fixed on the unit base 2 with solder.

Furthermore, a through hole 7b, which has its inner surfaces plated with copper foils, is disposed on the flexible printed circuit board 7a so that a fixing pillar 5d, which is formed on the sensor holder 5, can be pressed into the through hole 7b.

A shield case 8 has an elongated hole-like window 8a formed on its side surfaces, a guide wall and a pillar hole 8b for receiving a pillar (boss) 5c provided on the sensor holder 5 and a pillar hole 8b disposed on its top side opposite to the flexible printed circuit board 7a.

Projected sections comprising of a claw 8c, which are provided on the opening side of the shield case 8, are fixed in a mounting hole 2d, and the mounting slots 2e of the unit base 2, which are for attaching the shield case 8 to the unit base 2. The projected sections are formed at a plurality of locations and their respective projected sections and claws 8c prevent the shield case 8 from getting disengaged from the unit base 2. Thus, the swing arm 3, chopping drum 4, sensor holder 5, pyroelectric infrared sensor 6, electronic circuit components and the like are contained inside the shield case 8.

Next, an explanation will be made on how the non-contact thermometer of the present exemplary embodiment performs. As shown in FIG. 1, a chopping drum 4 is first rotated by the rotation of a motor 1, a pyroelectric infrared sensor 6 detects the amount of infrared rays that are radiated from an object to be measured, which are transmitted through the alternating slits 4a, and the amount of infrared rays, which are transmitted from the side walls 4b of the chopping drum 4. The difference between the foregoing amounts of infrared rays is then inputted to an electronic circuit 7 as an electrical signal.

A thermistor 12 built in the electronic circuit 7 detects the temperatures inside the chopping drum 4 and these detected temperatures are inputted into the electronic circuit 7 as electrical signals.

Since the swing arm 3 swings in conjunction with the swinging of the chopping drum 4, the pyroelectric infrared sensor 6 also swings accordingly. The swinging of a swing arm in conjunction with the swinging of a chopping drum will be explained below with reference to FIG. 2(a) to FIG. 2(c). As shown in the drawings, when a chopping drum 4 swings, then the swing arm 3 is also made to swing by a cam follower 3h which slides while keeping in contact with a decentered cam 4c formed on the bottom surface of the chopping drum 4.

Thus, as illustrated in FIGS. 1 and 3, a pyroelectric infrared sensor 6 can detect the approximate temperatures of an object 10 to be measured and side walls 4b of the chopping drum 4 by swinging in a fashion which alternates between clockwise and counterclockwise directions. The chopping drum 4 has slits 4a in its side walls, and can detect the amount of infrared rays from the object 10 to be measured at a plurality of points by also swinging the pyroelectric infrared sensor 6. As a result, the present invention provides a non-contact thermometer that makes it possible to accurately measure a temperature distribution of an object 10 to be measured in a non-contact manner.

Next, a flexible printed circuit board 7a comprised of an electronic circuit 7 will be explained with reference to FIG. 4(a) to FIG. 4(c). The flexible printed circuit board 7a is formed by superimposing one copper foil upon another with each respective copper foil sandwiched between thin resin films and characterized by presenting excellent bending properties.

As shown in FIG. 4(a), the pyroelectric infrared sensor 6 is mounted on the flexible printed circuit board 7a, in an area between two slits. The flexible printed circuit board 7a can be readily bent such that the bend extends between the two slits without causing any damage or problems, thus making it possible to readily mount the pyroelectric infrared sensor 6 on a sensor holder 5, as illustrated in FIG. 4(b).

Furthermore, narrow belt-like connection leads 7c are formed on the flexible printed circuit board 7a and fastened to the terminals 7d that are connected to the feedthrough ceramic capacitor 9. The capacitors 9 are fixed on a unit base 2 with solder for the purpose of eliminating external noise.

The narrow belt like connection leads 7c are twisted every time the swing arm 3 swings. However, since the printed circuit board 7a is comprised of very thin copper foil, which is protected by a resin coating, it does not incur damage due to the twisting.

A plurality of holes 7b, each of which having a slightly smaller diameter than the outer diameter of a mounting pillar 5d formed on the sensor holder 5, are provided on the side of the flexible printed circuit board 7a on which electronic components are mounted. The sensor holder 5 and the flexible printed circuit board 7a are securely put together by pressing the pillars 5d into the holes 7b.

As shown in FIG. 4(c), the copper foil in the periphery of the hole 7b is deformed upwards such that it is wedged against the mounting pillar 5d. This wedging prevents the mounting pillar 5d from sliding off the flexible printed circuit board 7a and thereby assures for a solid linkage.

Moreover, a thermistor 12, which is mounted on the flexible printed circuit board 7a, is situated inside a window hole 5f formed on the sensor holder 5, as shown in FIG. 4(b), when the flexible printed circuit board 7a is folded in half. This location of the thermistor 12 makes it possible to detect temperatures in the vicinity of the chopping drum 4 located below the thermistor 12 and to use these detected temperatures instead of using the temperatures of the chopping drum 4.

Figure 5:
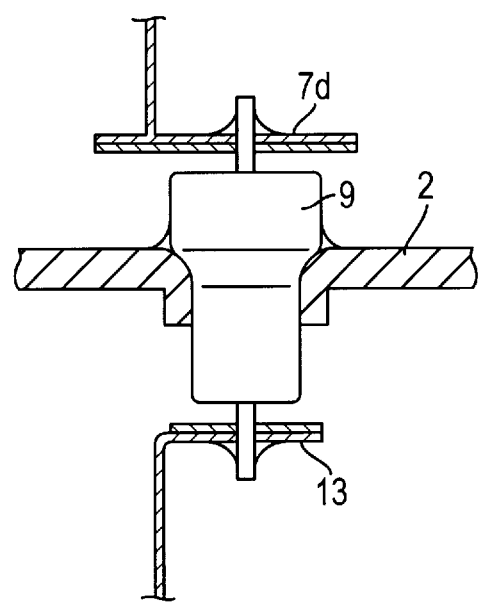
FIG. 5 is a cross-sectional view to show how a feedthrough ceramic capacitor is mounted in the first exemplary embodiment of the present invention.

FIG. 5 illustrates the manner in which the feedthrough ceramic capacitor 9 is fixed on the unit base 2 with solder. The feedthrough ceramic capacitor 9 is mounted by soldering directly onto the unit base 2. The unit base 2 is made from a solder plated steel sheet and has a cylindrically-shaped hole which has been made by a metal stamping process. The connection of the terminals 7d of the flexible printed circuit board 7a to the pyroelectric infrared sensor 6, as well as the electronic circuit 7 mounted on the flexible printed circuit board 7a, which is affixed to an external flexible printed circuit board 131, which is connected to external circuits by way of the feedthrough ceramic capacitor 9, makes it possible to shield off external electrical noises.

Thus, it is demonstrated from the foregoing exemplary embodiment that the present invention makes it possible to simultaneously mount all of the electronic circuit components with solder, including a pyroelectric infrared sensor and a thermistor, on one side of a flexible printed circuit board. The flexible printed circuit board is cut into slit like shapes so as to be bendable and to serve as a circuit substrate, which can connect with the pyroelectric infrared sensor. Thus, the present design eliminates the necessity of preforming the leads of the pyroelectric infrared sensor. This reduces the associated processing steps and related costs.

Furthermore, since the flexible printed circuit board is fixed to a sensor holder by pressing a sensor holder boss into a hole (having a diameter less than the diameter of the boss) disposed on the flexible printed circuit board, the need for inserting a mounting screw is eliminated, thereby simplifying and automating the assembly.

Moreover, the solder plated steel sheet of the unit base makes it easier to solder a feedthrough ceramic capacitor directly onto the unit base. This provides for the feedthrough ceramic capacitor to separate the circuits inside of a non-contact thermometer from the circuits outside of the non-contact thermometer (including the flexible printed circuit board). As a result, associated external electrical noises are prevented from infiltrating to the inside of the non-contact thermometer, thereby enhancing the ability to take accurate measurements.

[Exemplary Embodiment 2]

As discussed previously, FIG. 1 shows how the non-contact thermometer of the first or second exemplary embodiment of the present invention is structured. The non-contact thermometer of the second exemplary embodiment has common elements with the first exemplary embodiment and, therefore, an explanation on such elements will be omitted by using the same reference numerals.

Next, an explanation will be made an how the non-contact thermometer of the present exemplary embodiment performs. As shown in FIG. 1, a chopping drum 4 is first rotated by the rotation of the motor 1, the pyroelectric infrared sensor 6 alternately detects the amount of infrared rays received from an object 10 to be measured and the amount of infrared rays from the side walls 4b of the chopping drum 4 through the slits 4a. The difference between the foregoing amounts of infrared rays is inputted to the electronic circuit 7 as an electrical signal. The thermistor 12, serving as a temperature detection means to detect the temperatures of the chopping drum 4, outputs electrical signals corresponding to the temperatures detected to the electronic circuit 7.

Figure 7A:
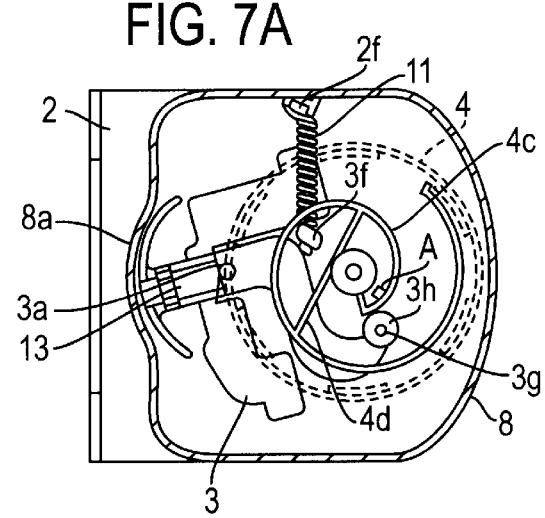
FIG. 7(a) to FIG. 7(c) are top plan sectional views to show operating conditions of the swing arm of the non-contact thermometer in the second exemplary embodiment of the present invention.
Figure 7B:
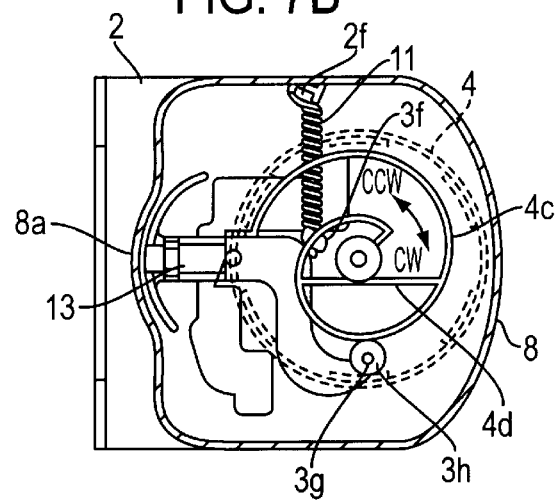
Figure 7C:
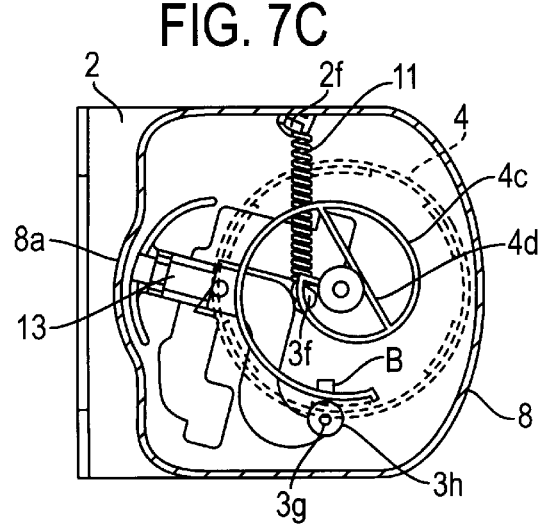

As shown in FIGS. 7(a)–(c), a swing arm 3 rotates in conjunction with the rotation of the chopping drum 4 as a result of a cam follower 3h being attached to the swing arm 3. The swing arm is linked with a first cam 4c and a second cam 4d by a pulling spring 11, thereby causing the pyroelectric infrared sensor 6 also to rotate.

Thus, the pyroelectric infrared sensor 6 can detect the approximate temperatures of an object 10 to be measured and the side walls 4b of the chopping drum 4 by rotating the chopping drum 4, which has slits 4a disposed on its side walls. Further, the temperature of the objects 10 can accurately be measured in a non-contact manner at a plurality of points by rotating the pyroelectric infrared sensor 6.

Next, a method for establishing a reference position of rotation for the chopping drum 4, swing arm 3 and the like will be explained with reference to FIGS. 1, 3, 6 and 8.

Figure 6:
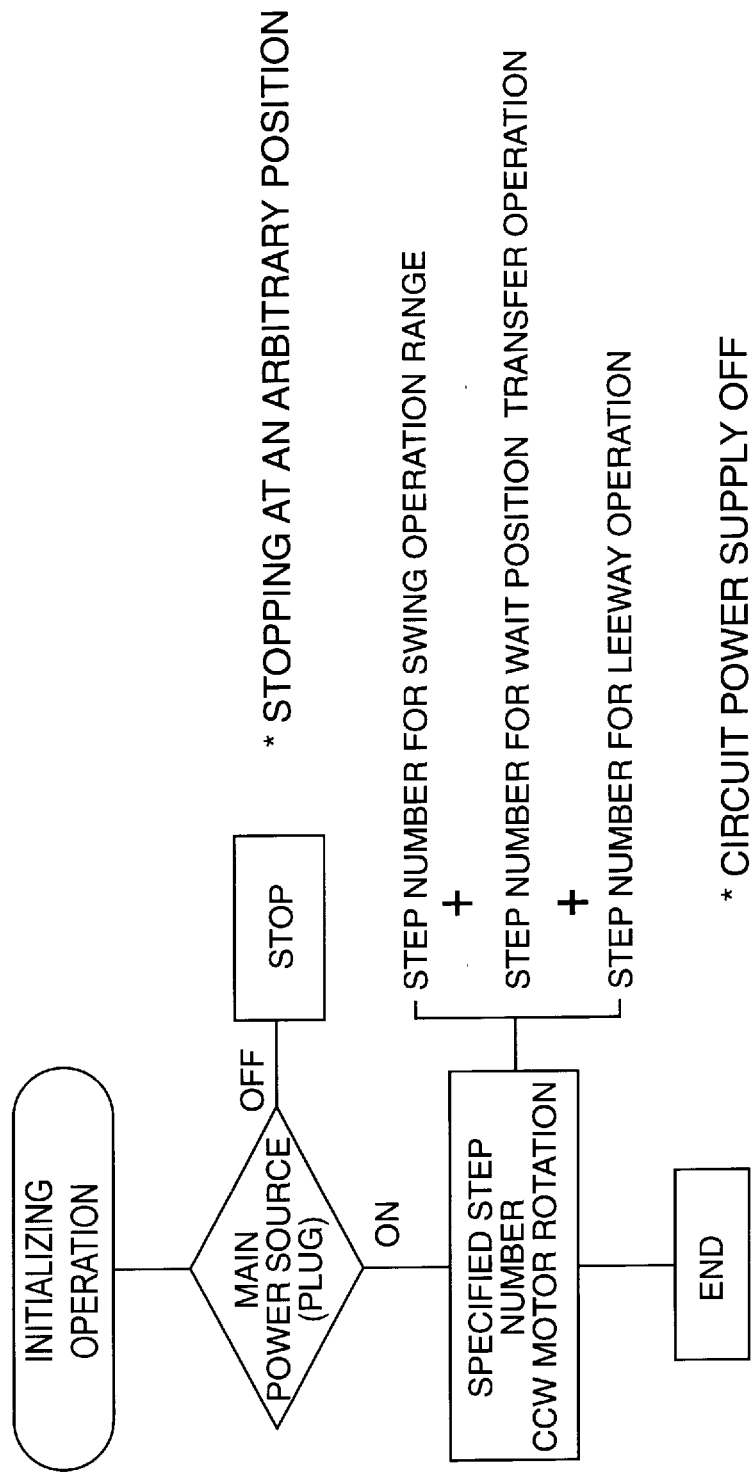
FIG. 6 is a flow chart to show how the initializing operation of the non-contact thermometer is performed in the second exemplary embodiment of the present invention.

FIG. 6 is a flow chart which shows how the initializing operation of the non-contact thermometer is performed in the present second exemplary embodiment. When an electric power source is turned on, each respective element, such as the chopping drum 4, swing arm 3 or the like is at an arbitrary stopping position as shown in FIG. 8, thus placing the reference positions in an obscure state. Therefore, in order to give the rotational performance a maximum scope and an operational leeway, the stepping motor 1 is fed with a series of performance input steps, where it is finally brought to a stop at a pre-established reference exciting phase.

The operation thereafter takes place based on the reference exciting phase after the stepping motor has been brought to a stop. Here, the maximum scope in operation means the scope where the swinging action of the swing arm 3 travels to a waiting position. The operational leeway refers to a scope outside the maximum scope in operation which can be observed at a cam 4c of the chopping drum 4.

As illustrated in FIG. 3, the reference position of rotation coincides with the waiting position of the pyroelectric infrared sensor 6, and at this time the opening of an aperture 13 is closed by a shield case 8.

Although a stepping motor is used as a prime motor in the present exemplary embodiment, a DC motor can also be used. In such a case the performance of the control system can be made simpler than that with a stepping motor.

Next, with reference to FIG. 7(a) to FIG. 7(c), a detailed explanation is provided on how the lower part of the chopping drum 4 is structured. A cam 4c formed on and projected from the bottom surface of the chopping drum 4 is pressed onto a cam follower formed of a cam roller 3h that is freely rotating around a pillar 3g located on the end of the swing arm 3 by means of a tensile spring 11. The respective ends of the tensile spring 11 are fastened to spring holders 2f and 3f of the unit base 2 and swing arm 3.

Since the cam roller 3h is pressed onto the cam 4c, the swing arm 3 is made to rotate according to the rotation of the motor 1. Therefore, when the contact point A, between the cam 4c and the cam roller 3h (as shown in FIG. 7(a)) moves to the contact point B (in FIG. 7(c)) due to the clockwise ("CW" hereafter) rotation of the chopping drum 4, the swing arm 3 is rotated around a pillar 3a serving as the center of rotation. At this time, the motor 1 is rotated so as to make the swing arm 3 move in a sequence as shown in FIGS. 7(a)–(c), and is pre-set to reverse its rotation to bring back the swing arm 3 to the position as shown in FIG. 7(a).

Figure 8A:
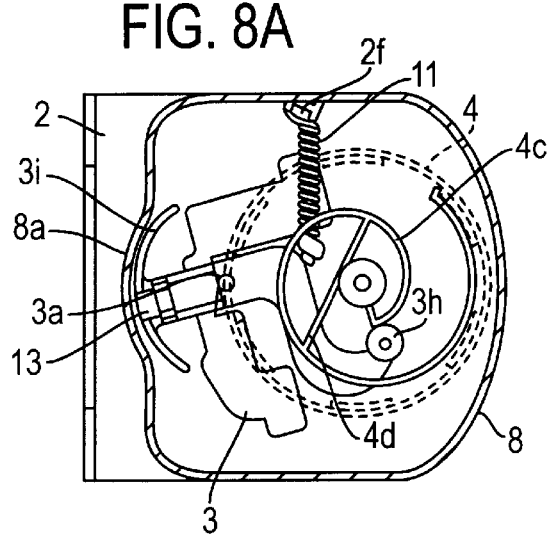
FIG. 8(a) to FIG. 8(c) are top plan sectional views to show operating conditions of the swing arm of the non-contact thermometer during the transition to a waiting position in the second exemplary embodiment of the present invention.
Figure 8B:
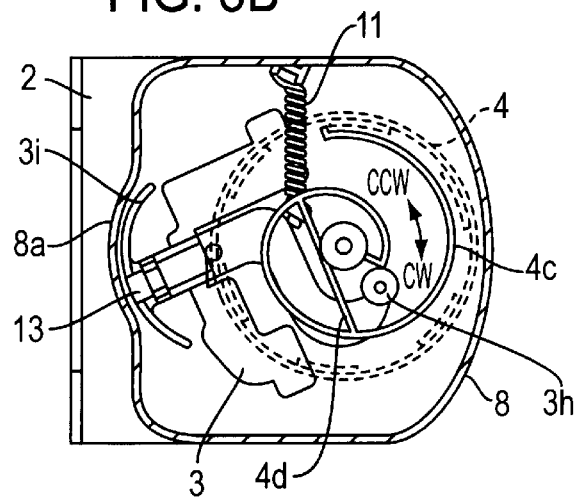
Figure 8C:
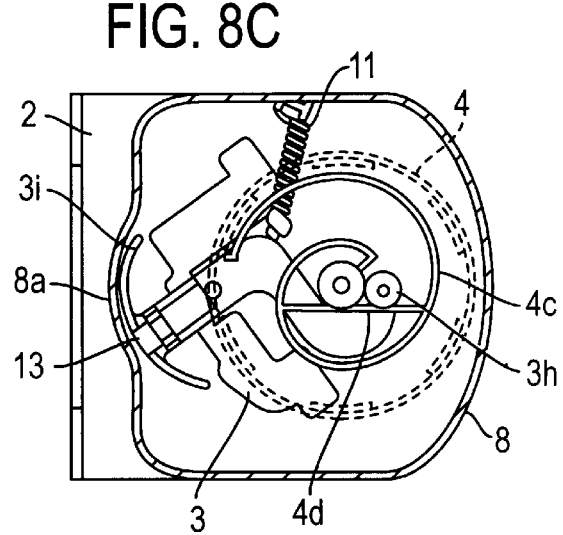

Next, as illustrated in FIGS. 8(a)–8(c), the swing arm 3a undergoes a transitional movement until it reaches its waiting position, which takes place prior to measuring the temperatures. An inner cam 4d formed on and protruding from the lower surface of the chopping drum 4 is linked with the cam 4c. When the motor 1 is rotated counterclockwise ("CCW" hereafter) from the position that brings about the state as shown in FIG. 8(a) (the position where a swing movement ends), the cam roller 3h of the swing arm 3 hits the inner cam 4d, as illustrated in FIG. 8(b).

Thereafter, the cam roller 3h moves along the inner cam 4d as the motor 1 rotates. In other words, the swing arm 3 can be moved from the state of FIG. 8(a) to the waiting position, as shown in FIG. 8(c), by feeding a specified pulse input to the motor 1.

By making the last exciting phase of the foregoing specified pulse input coincide with the reference exciting phase established in the beginning, the reference position is set up every time the waiting operation takes place, thus enabling the measurement of temperatures without worrying about variations in position that might have been caused by a long non-operational period, mechanical vibrations and the like.

A cylindrical-shaped aperture 13, which is formed on the tip end of the swing arm 3, in combination with a sensor holder 5 limits the amount of the infrared rays radiant from an object to be measured and incident on the pyroelectric infrared sensor 6.

The aperture 13 moves to a position concealed from the window hole 8a of the shield case 8 at the waiting position. Further, as shown in FIG. 8(c), a shield plate 3i, having an area slightly larger than the area of the foregoing window hole 8a of the shield case 8, is formed by molding one piece with both sides of the tip end of the aperture 13 so as to keep a shape that curves along the periphery of the window hole 8a of the shield case 8 and also to maintain a small gap from the shield case 8. During the waiting state, the foregoing shield plate 3i closes the shield window 8a of the shield case 8, thereby allowing the inside of the non-contact thermometer of the present exemplary embodiment to be shielded from the environment.

The motor 1 moves counterclockwise at the foregoing waiting position (the reference position) when it is fed with the same input pulses as the ones fed to the swing arm 3 for covering the swing end position through the waiting position. As such, the cam roller 3h of the swing arm 3 is guided by the cam 4c of the chopping drum 4 and the swing arm 3 is made to move to the swing start position as shown in FIG. 8(a).

Next, a combination of the swing arm 3 and sensor holder 5 will be explained in detail with reference to FIG. 9(a) and FIG. 9(b). As illustrated in FIG. 9(a), a cylindrical aperture, which serves as a channel for limiting the amount of infrared rays getting to a pyroelectric infrared sensor 6 from an object to be measured, is comprised of a U-shaped slot 3d of the swing arm 3 and an inverted U-shaped slot 5b of the sensor holder 5. The diameter of the foregoing cylindrical aperture is smaller than the effective diameter of a light-gathering lens 6b provided on the tip end of the pyroelectric infrared sensor 6. As a result, this prevents the infrared rays, which are radiated from objects other than the object to be measured, from entering into the pyroelectric infrared sensor 6.

The relative position between the swing arm 3 and the sensor holder 5 is fixed and these components are put together securely by means of fixing claws 3e formed on the U-shaped slot 3d of the swing arm 3 and guide ribs 5e formed on the inverted U-shaped slot 5b of the sensor holder 5.

Furthermore, an interfacing surface is provided on the upper part of the swing arm 3 to accommodate the sensor holder 5 and the fixing claws 3b and 3c are formed on the foregoing interfacing surface to hold the sensor holder 5 securely by clamping.

Figure 10:
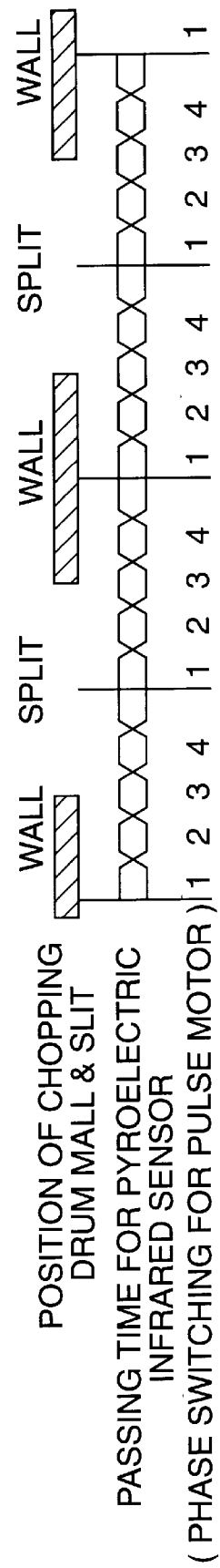
FIG. 10 is a chart to show the operation timing of the stepping motor versus the chopping drum for the non-contact thermometer in the second exemplary embodiment of the present invention.
Figure 11:
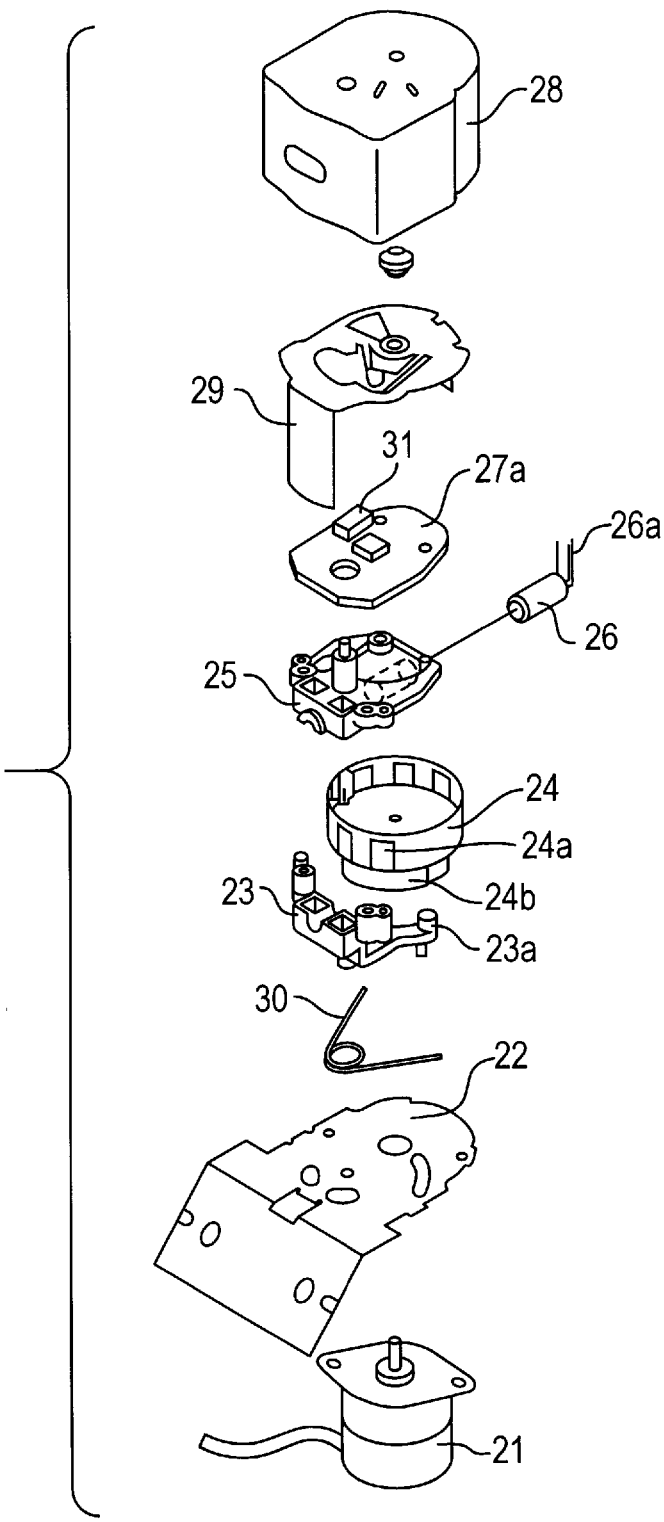
FIG. 11 is an exploded Perspective view to show how a conventional non-contact thermometer is structured.
Figure 12:
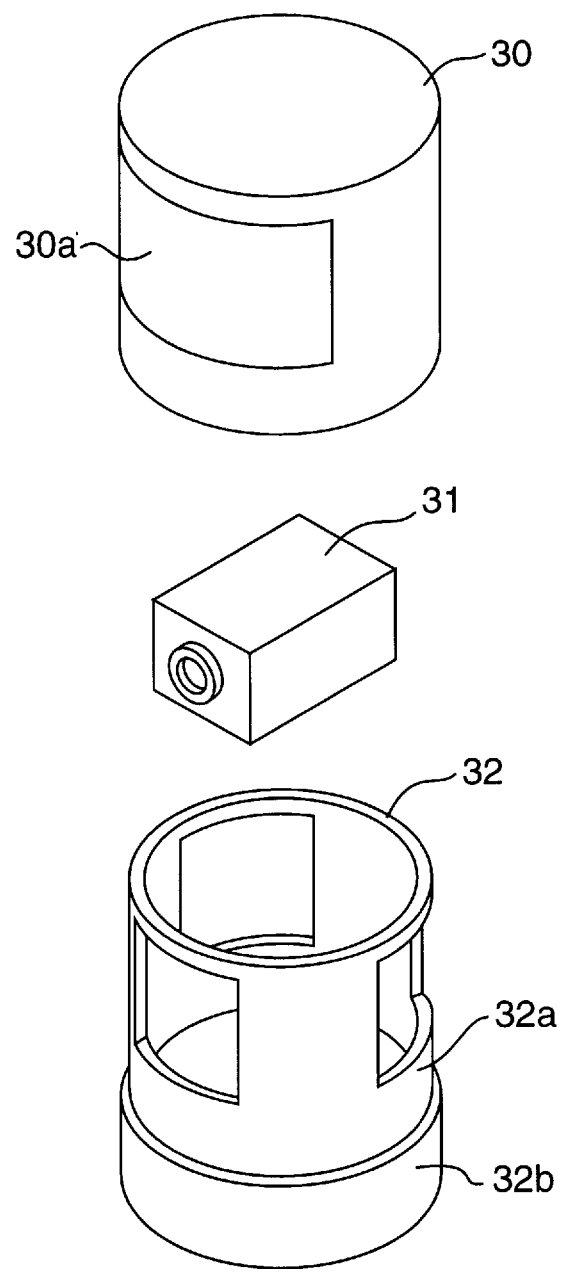
FIG. 12 is an exploded perspective view to show how some segments of another conventional non-contact thermometer are structured.

Next, the operation of the stepping motor 1, pyroelectric infrared sensor 6 and chopping drum 4 will be explained with reference to FIG. 10. In the present exemplary embodiment, a four phase motor is used as the stepping motor 1. The first phase serves as the reference phase and is adjusted so that the center of the foregoing Pyroelectric infrared sensor 6 is positioned with the center of walls 4b or slits 4a, which are located equidistant from one another around the perimeter of the chopping drum 4. This enables the pyroelectric infrared sensor 6 to pass by the center of the walls 4b and slits 4a when the stepping motor 1 is rotated. At this time, when the motor speed is reduced, enough time exists to measure the amount of infrared rays from the object to be measured. The infrared rays pass through the foregoing aperture for comparing the amount of infrared rays from the chopping drum 4.

As is evident from the foregoing explanations of the exemplary embodiments, the non-contact thermometer of the present invention comprising: a pyroelectric infrared sensor; a motor rotatable in either direction and mounted on a unit base; a cylindrically-shaped chopping drum having a bottom; a cam provided on the bottom of the chopping drum; a swing arm having a cam follower that remains in contact with the foregoing cam by sliding thereon; a sensor holder; and a shield case having an opening extending in width to cover the swing range of an aperture provided on the swing arm, makes it possible to quickly measure the temperatures on an object to be measured at a plurality of points located over a certain range or area.

Furthermore, since the foregoing cam includes a first cam that is used to swing the swing arm and a second cam that guides the swing arm to a waiting position, the aperture can be closed inside the window of the shield case, thereby shielding it from the outside and preventing the entry of dirt and the like. Moreover, a shield plate provided on the tip end of the swing arm closes the window of the shield case at the waiting position, thus enhancing the dust prevention effect even further.

What is claimed is:

1. A non-contact thermometer comprising:
   a motor mounted on a unit base and rotatable clockwise and counterclockwise, wherein said motor rotates with step rotational angles, said angles being adjustable;
   a cylindrical chopping drum rotated by said motor and provided with opening slits;

a pyroelectric infrared sensor having a tip end for detecting infrared rays radiated from an object to be measured and passing through said slits of said cylindrical chopping drum;

a first cam provided on the bottom of said cylindrical chopping drum;

a swing arm having a cam follower that contacts said first cam;

a sensor holder being attached on said swing arm, and being located inside of said cylindrical chopping drum and holds said pyroelectric infrared sensor;

a detector for detecting temperatures of said cylindrical chopping drum, said detector being affixed to said sensor holder; and a shield case that contains said cylindrical chopping drum, pyroelectric infrared sensor, swing arm and sensor holder, and has a window for receiving infrared rays from an object to be measured, wherein said chopping drum includes said first cam for guiding said swing arm that supports said pyroelectric infrared sensor within a maximum range of rotation defining a period of temperature measurement, wherein the motor having the step rotational angles adjusts its steps of rotation during the period of temperature measurement, and a second cam that guides the swing arm to a waiting position outside of the maximum range of rotation of the period of temperature measurement, wherein the waiting position establishes a reference position for the motor to establish an exciting phase for activating said motor to commence the maximum range of rotation for the period of temperature measurement.

2. The non-contact thermometer according to claim 1, wherein said motor has its revolution speed decrease when said pyroelectric infrared sensor aligns near the center of said opening slits of said chopping drum as compared to the normal revolution speed of said motor, whereby the period of temperature measurement is extended for directing the infrared rays radiated from an object to be measured and passing through said slits of said chopping drum to said pyroelectric infrared sensor.

3. The non-contact thermometer according to claim 1, further comprising an aperture being located in the space between said pyroelectric infrared sensor and said window provided on said shield case and has a smaller diameter than the light-gathering diameter of a focus lens disposed on the tip end of said pyroelectric infrared sensor.

4. The non-contact thermometer according to claim 1, further comprising an aperture disposed in said swing arm having a cylindrical shape.

5. The non-contact thermometer according to claim 3 or claim 4, further comprising a cover located near said aperture in a gap formed between said aperture and the inner walls of said shield case and that masks areas of said infrared rays gathering window of said shield case other than the area corresponding to a perimeter of said aperture.

6. A non-contact thermometer comprising:

a stepping motor mounted on a unit base, said stepping motor being rotatable in one direction in adjustable step rotational angles and in a reverse direction to a predetermined reference position, wherein said motor having the step rotational angles adjusts its steps of rotation during a period of temperature measurement;

a cylindrical chopping drum rotated by said stepping motor, said cylindrical chopping drum provided with opening slits;

a pyroelectric infrared sensor having a tip end for detecting infrared rays radiated from an object to be measured and passing through said opening slits of said cylindrical chopping drum;

a swing arm having a cam follower located on said cylindrical chopping drum so that they rotate in conjunction with said cylindrical chopping drum;

a sensor holder for holding said pyroelectric infrared sensor, said sensor holder being attached to said swing arm, and said sensor holder being located inside of said cylindrical chopping drum;

a detector for detecting temperatures of said pyroelectric infrared sensor, said detector being affixed to said sensor holder; and a shield case that contains said cylindrical chopping drum, pyroelectric infrared sensor, swing arm and sensor holder, and has a window for receiving infrared rays from an object to be measured, wherein said pyroelectric infrared sensor detects the temperatures of the object at a plurality of points in conjunction with the rotation of the swing arm.

* * * * *